VIDEO REPRODUCER SWITCHING AND SIGNAL PROCESSING SYSTEM

INVENTOR.
ARTURO E. STOSBERG
BY Robert Mednick
ATTORNEY

May 21, 1968 A. E. STOSBERG 3,384,708

VIDEO REPRODUCER SWITCHING AND SIGNAL PROCESSING SYSTEM

Filed Aug. 23, 1965 8 Sheets-Sheet 2

INVENTOR.
ARTURO E. STOSBERG

BY Robert Mednick

ATTORNEY

May 21, 1968 A. E. STOSBERG 3,384,708

VIDEO REPRODUCER SWITCHING AND SIGNAL PROCESSING SYSTEM

Filed Aug. 23, 1965 8 Sheets-Sheet 3

INVENTOR
ARTURO E. STOSBERG
BY Robert Mednick

ATTORNEY

May 21, 1968 A. E. STOSBERG 3,384,708

VIDEO REPRODUCER SWITCHING AND SIGNAL PROCESSING SYSTEM

Filed Aug. 23, 1965 8 Sheets-Sheet 4

INVENTOR.
ARTURO E. STOSBERG
BY Robert Mednick
ATTORNEY

VIDEO REPRODUCER SWITCHING AND SIGNAL PROCESSING SYSTEM

Filed Aug. 23, 1965 8 Sheets-Sheet 5

INVENTOR.
ARTURO E. STOSBERG
Robert Mednick
ATTORNEY

May 21, 1968 A. E. STOSBERG 3,384,708

VIDEO REPRODUCER SWITCHING AND SIGNAL PROCESSING SYSTEM

Filed Aug. 23, 1965 8 Sheets-Sheet 6

INVENTOR.
ARTURO E. STOSBERG

BY Robert Mednick

ATTORNEY

May 21, 1968 A. E. STOSBERG 3,384,708

VIDEO REPRODUCER SWITCHING AND SIGNAL PROCESSING SYSTEM

Filed Aug. 23, 1965 8 Sheets-Sheet 7

INVENTOR
ARTURO E. STOSBERG
BY Robert Medwick
ATTORNEY

May 21, 1968 A. E. STOSBERG 3,384,708

VIDEO REPRODUCER SWITCHING AND SIGNAL PROCESSING SYSTEM

Filed Aug. 23, 1965 8 Sheets-Sheet 8

INVENTOR.
ARTURO E. STOSBERG

BY Robert Nedrick

ATTORNEY

United States Patent Office 3,384,708

Patented May 21, 1968

3,384,708

VIDEO REPRODUCER SWITCHING AND SIGNAL PROCESSING SYSTEM

Arturo E. Stosberg, Palo Alto, Calif., assignor to MVR Corporation, Palo Alto, Calif., a corporation of California Filed Aug. 23, 1965, Ser. No. 481,609
18 Claims. (Cl. 178—6.6)

The present invention relates to a processing system for an apparatus reproducing a continuous composite video signal recorded on separated tracks on a storage member, and more particularly the present invention relates to a processing system for an apparatus reproducing a continuous composite video signal recorded on separated tracks on a storage member without disturbing or losing any of the recorded horizontal synchronization signals thereof, and for removing all possible switching transients in the reproduced video signal.

In apparatus for recording a composite video signal, a rotary member is generally utilized which carries two or more transducers such as magnetic record heads. A contiuous composite video signal such as a television signal, after being suitably prepared for recordation by being modulated and amplified by an electronic record circuit, is successively applied to the transducers. Accordingly, successive separate portions of the video signal are alternately applied to the record heads. The rotational speed of the rotary member is synchronized with respect to the field or frame rate of the video signal. For this purpose, a positioning signal is derived from the rotary member determining the rotative positions thereof. The positioning signal is compared with the vertical synchronization signal of the composite video signal in a speed control system which coordinates the speed and phase of the rotary member with the field or frame rate of the video signal.

The rotary member is rotated so that its transducers will diagonally scan a moving storage member such as magnetic tape. A capstan is provided to move the magnetic tape at a constant speed. As a result, the video signal is successively recorded on separated successive tracks formed across the magnetic tape by the magnetic heads alternately scanning the moving tape. The magnetic heads are positioned along the circumference of the rotary member so that the lengths of these record tracks are substantially equal. These recorded tracks generally do not extend across the entire width of the magnetic tape, but instead extend between margins from each edge thereof. Other information is recorded on these margins along the length of the tape, such as magnetic tape speed control signals, audio signals, record identifying signals, etc.

For reproducing or playback, an identical or similar rotary member (in another apparatus or machine) may be used to pick up the recorded video signal on the magnetic tape. The magnetic heads of the rotary member will then be designed to be used either as a record head or a playback head. During playback, these heads will be switched to be connected to a reproduce circuit which demodulates, amplifies, and otherwise suitably prepares the reproduced signal for a desired output, such as to a television receiver. The rotary member will be timed to rotate at the same speed as during record, and the magnetic tape will also be moved at the same rate as during record. In order to properly time the rotation of the rotary member during playback, the aforesaid positioning signal is also derived from the rotary member together with a record timing reference signal recorded on a longitudinal track on the magnetic tape near an edge thereof. The servo control system is used to compare the positioning signal with the record timing reference signal to control the speed and phase of the rotary member during playback to correspond with the speed and phase thereof during record. The transducers of the rotary member will thereupon scan the successive tracks in substantially the same order and time relationship as during record, and accurately reproduce the recorded signal from the successively scanned separated tracks. The reproduce circuit will alternately receive the reproduced signals from each head and form a combined signal duplicating the original composite video signal.

In such apparatus for recording a video signal, it is convenient and desirable to record a single complete field or frame of a video signal on each track of the magnetic tape. For this purpose, the rotary member thereof may have two transducers located at opposite ends of a diameter thereof which are made to alternately scan each successive diagonal or transverse track on the tape. In recording a single field of a video signal, each track is preferably commenced and terminated during the vertical retrace period of the video signal so as not to possibly disrupt any picture information of the video signal. Also, each track is preferably selected to be commenced and terminated in between (e.g. about the middle thereof) the last occurring equalizing pulse and the beginning of the subsequent picture information signal of each vertical blanking period. In that event, switching of the heads will occur only when horizontal synchronization pulses exist which allows more time for controlling the switching so as not to disrupt these pulses than that available among the equalizing pulses or the vertical synchronization pulse signal. In such apparatus, during record, one head is switched on at the same time that the other head is switched off. As a result, each record head is made operative at the beginning of each track and made inoperative at the end of each track. As is well known, a record signal will also operate to erase any pre-recorded signals on magnetic tape. Consequently, each record head will then not be operative while traversing the margins along the edges of the tape, thereby any pre-recorded signal thereon will not be erased as a result thereof. Also, the length of the recorded tracks are thereby minimized to that necessary for recording a single video field, resulting in maximum space utilization of the available recording surface of the magnetic tape. During playback, the transducers will also be switched off while traversing the margins of the magnetic tape so as not to pick up the signals recorded thereon.

In reproducing the video signal with such a machine or apparatus, the rotary member will be rotated so that its transducers will retrace this scanning in substantially the same order and time relation as during record while the tape or record member is moved at the same rate as during record. A reproduce circuit will be connected to alternately receive the single fields of video signal from each head to recombine them to form a continuous video signal. However, it is practically impossible to switch during playback at exactly the same time as during record. As a result, during playback, a transducer may be switched off just prior to the end of the recorded track or be switched on just after the beginning of the track. When this happens, one or more horizontal synchronization pulses in the vertical retrace period of the video signal may not be picked up and therefore lost. Consequently, with the loss of one or more horizontal synchronization pulses, temporary loss of horizontal synchronization of the video signal may result.

There are several reasons why switching during playback cannot occur at exactly the same time as during record. One is that a different machine may be used for playback than that used for record, so that the occurrence of its positioning pulse will also differ due to machine tolerances. Even if the same machine is used for record and for playback, machine wear will cause changes resulting in a similar effect. Temperature changes and tape stretching will also cause such time differences. To overcome these reasons for changes in timing of the positioning pulse, electronic delay circuits may be provided to adjust the timing of the positioning pulse, however these delay circuits will be affected by power line fluctuations which will then offset the timing of the positioning pulse. Another reason, and perhaps even more important is that the positioning signal is not at all times controlled with respect to the horizontal synchronization signal of the video signal. As was mentioned, a speed control system is provided to properly phase the several portions of the recorded and reproduced video signal with respect to its vertical synchronization signal so that these several portions of the video signal are reproduced in proper phase with respect to each other. Such a speed control system will tend to align the horizontal synchronization signal with the positioning signal, but hunting will necessarily occur resulting in phase shifting between these signals.

The present invention overcomes the above-mentioned disadvantages by providing a processing system for the video reproducer to time the switching on of each head prior to the beginning of each track, and to time the switching off of each head until after the end of each track, in order to prevent the loss of any horizontal synchronization pulses in the reproduced signal. Accordingly, this processing system provides for a predetermined time overlap in playback switching. The present invention also times the switching with respect to the reproduced horizontal synchronization signal so as to occur between horizontal synchronization pulses thereof, therefore preventing the disturbance of any horizontal synchronization pulses. Although, as above noted, there are many causes for variances in timing of switching during record and playback, the processing system of the present invention overcomes the combined effects of all these time variances.

It will be also realized that switching in electronic circuits produces switching transients. Although such switching transients will be made to occur during the vertical blanking periods of the video signal in the above described apparatus, they may undesirably affect the horizontal synchronization of the reproduced video signal when utilized by television broadcast studio equipment or when applied to a television receiver. In addition, the switching transients may be visible as streaks of light during the vertical retrace period when the reproduced video signal is applied to a television receiver. Consequently, it is desirable to effectively remove all switching transients from the reproduced video signal. The processing system of the present invention also provides means for producing a series of clamping signals to effectively eliminate all the switching transients that may occur throughout the selected range of desired overlap in reproduce switching, thereby effectively eliminating those caused by the record as well as by the playback process. The series of clamping signals are timed to occur between the horizontal synchronization pulses in each of the vertical blanking periods of the reproduced video signal so as not to disturb any of the horizontal synchronization pulses.

It is therefore an object of this invention to provide a processing system for a video reproducer to selectively overlap the switching time periods of its scanning transducers to prevent any loss of video information.

Another object of this invention is to provide a processing system for a video reproducer to time the switching of its scanning transducers so as not to disturb the horizontal synchronization signal in the recorded video signal.

Still another object of this invention is to provide a processing system for a video reproducer for effectively eliminating the switching transients that may result from the record as well as the reproduce process.

A further object of this invention is to provide a processing system for a video reproducer that includes means for effectively eliminating the switching transients that may result from the record as well as the reproduce process, without disturbing the horizontal synchronization signal of the video signal.

A still further object of this invention is to provide a processing system for a video reproducer for combining a video signal recorded on separated tracks into a video signal equivalent to the original signal that was recorded.

Still a further object of this invention is to provide a reproducing apparatus including a processing system for combining into an equivalent original form a video signal that was recorded on separated tracks.

Another object of this invention is to provide a reproducing apparatus including a processing system for combining into an equivalent original form a video signal that was recorded on separated tracks, without losing or disturbing any of the synchronization signals thereof and at the same time eliminating the transients effects due to the process of separating and combining the video signal.

Still another object of this invention is to provide a processing system for a video reproducer which overcomes the effects of variances in the timing of switching due to several different causes.

The novel features which are believed to be characteristic of the invention, both as to its organization and method of operation, together with further objects and advantages thereof, will be better understood from the following description considered in connection with the acompanying drawings in which an embodiment of the invention is illustrated by way of example. It is to be expressly understood, however, that the drawings are for the purpose of illustration and description only, and are not intended as a definition of the limits of the invention.

Figure 1:
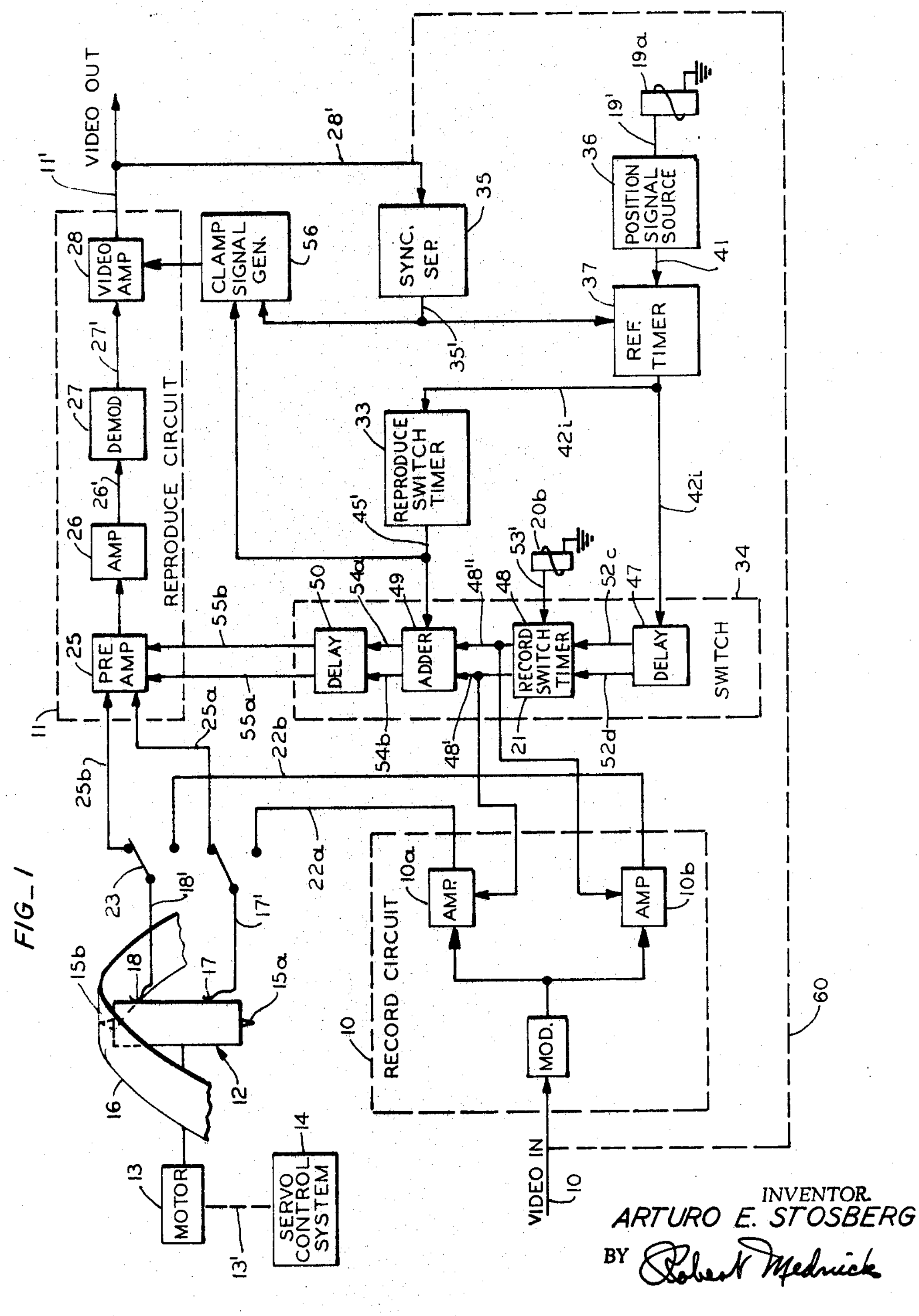
FIG. 1 is a simplified block diagram of a video recording and reproducing apparatus including a processing system of this invention.
Figure 6A:
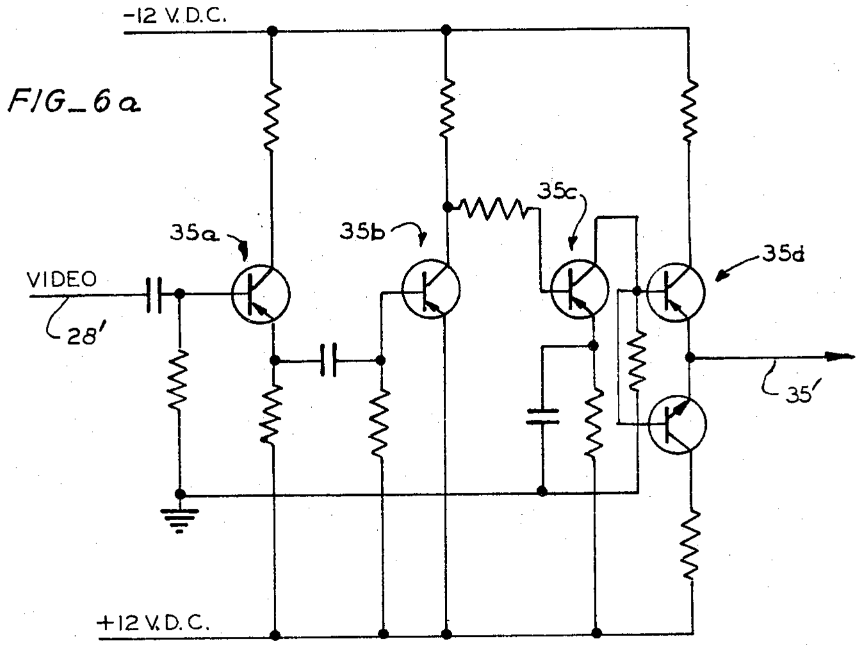

FIG. 6*a* is a schematic circuit diagram of the synchronization separator shown in block form in FIG. 1.

Figure 6B:
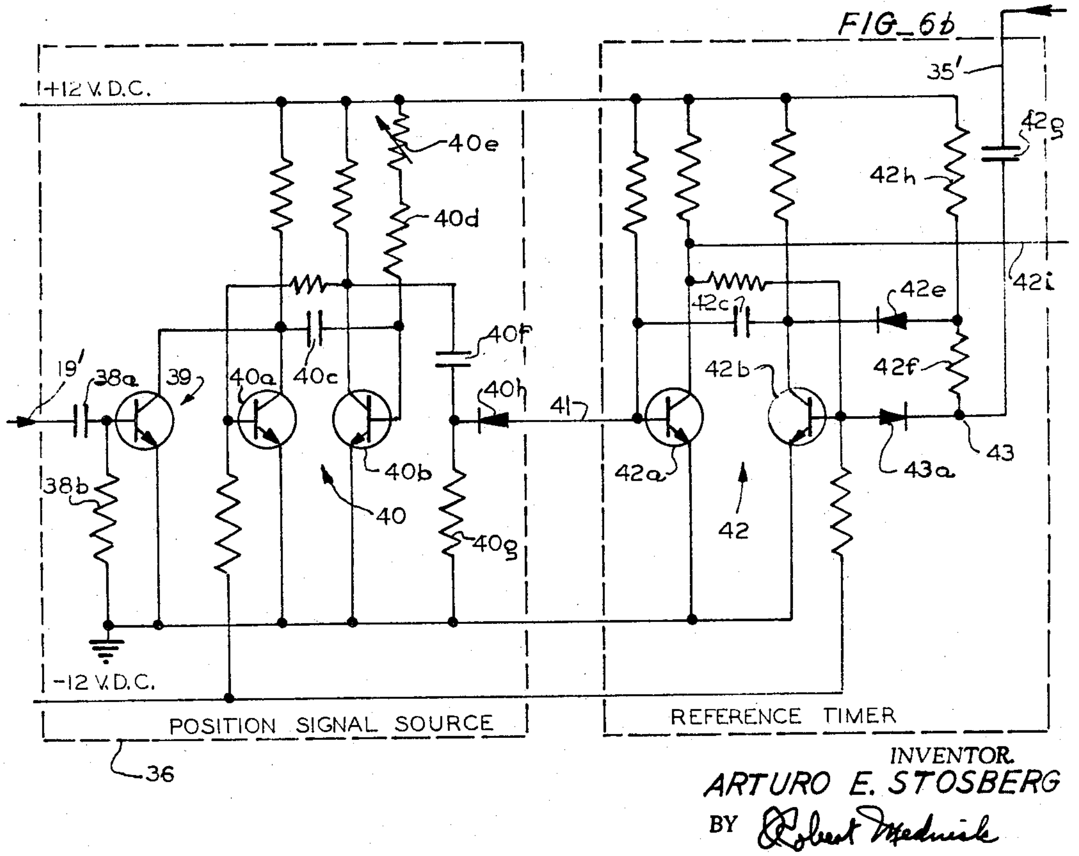

FIG. 6*b* is a schematic circuit diagram of the position signal source and reference timer shown in block form in FIG. 1.

Figure 6C:
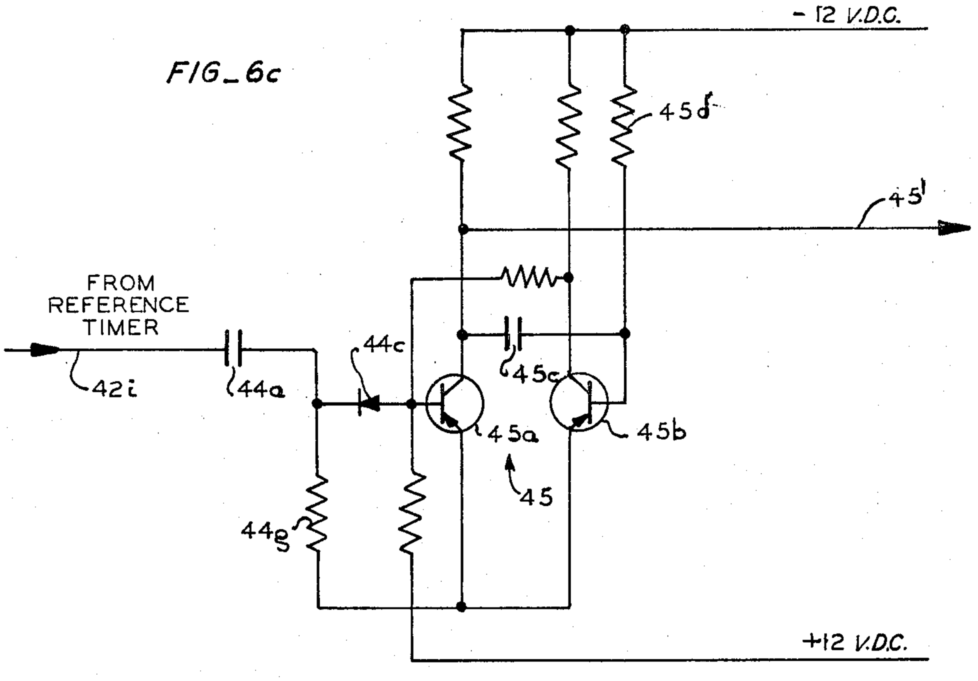

FIG. 6*c* is a schematic circuit diagram of the reproduce switch timer shown in block form in FIG. 1.

Figure 6E:
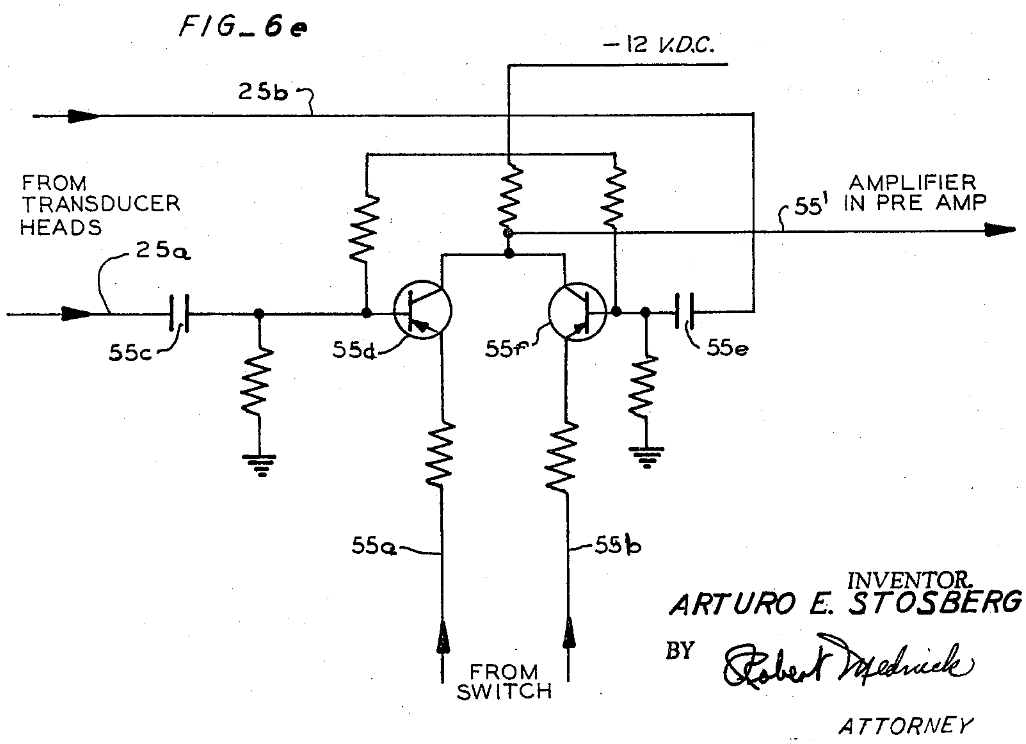
Figure 6D:
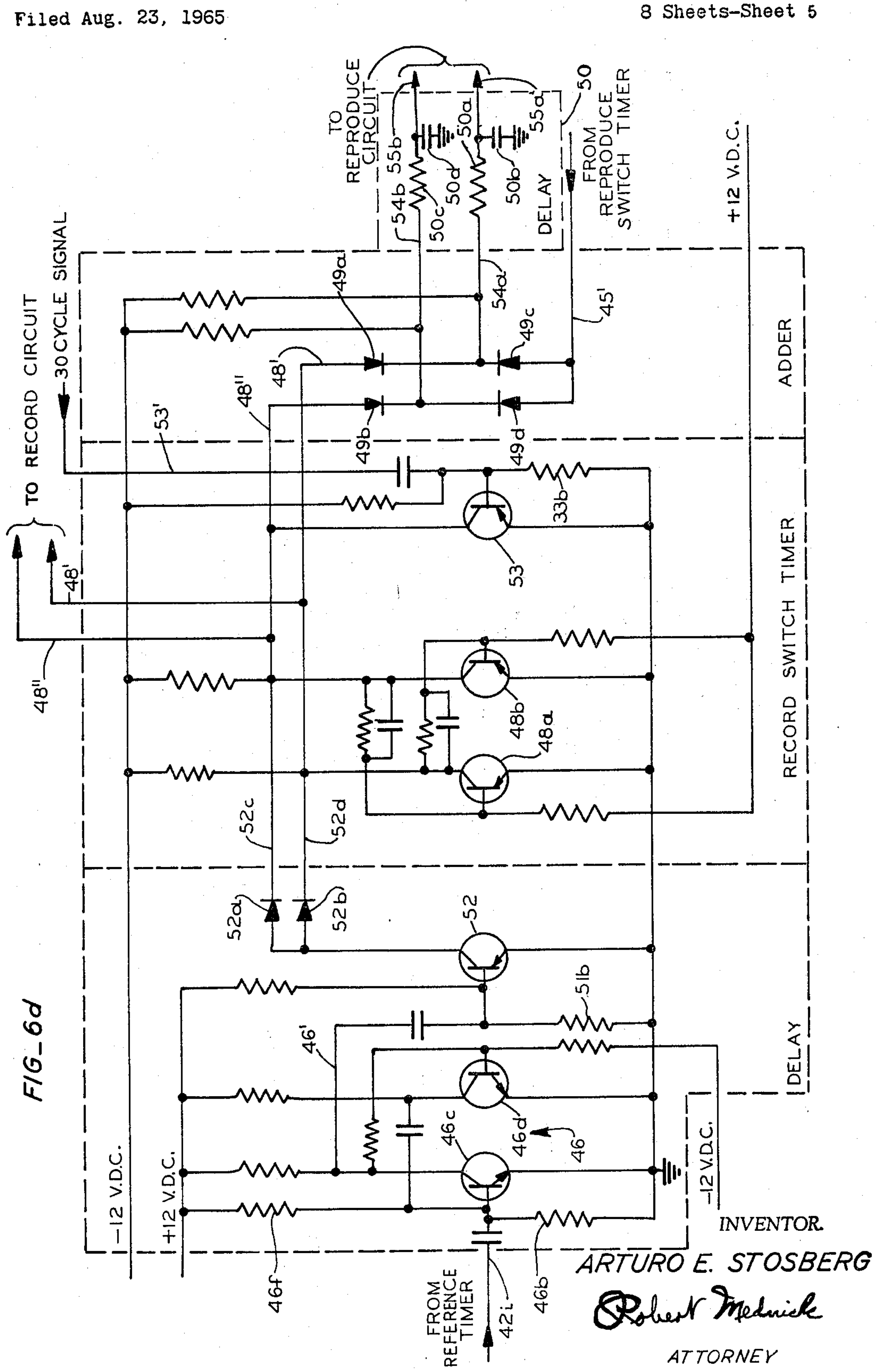

FIG. 6*d* is a schematic circuit diagram of the switch shown in block form in FIG. 1.

FIG. 6*e* is a schematic circuit diagram of a gating circuit that may be used in the reproduce circuit to be used in the described embodiment of this invention.

Figure 6F:
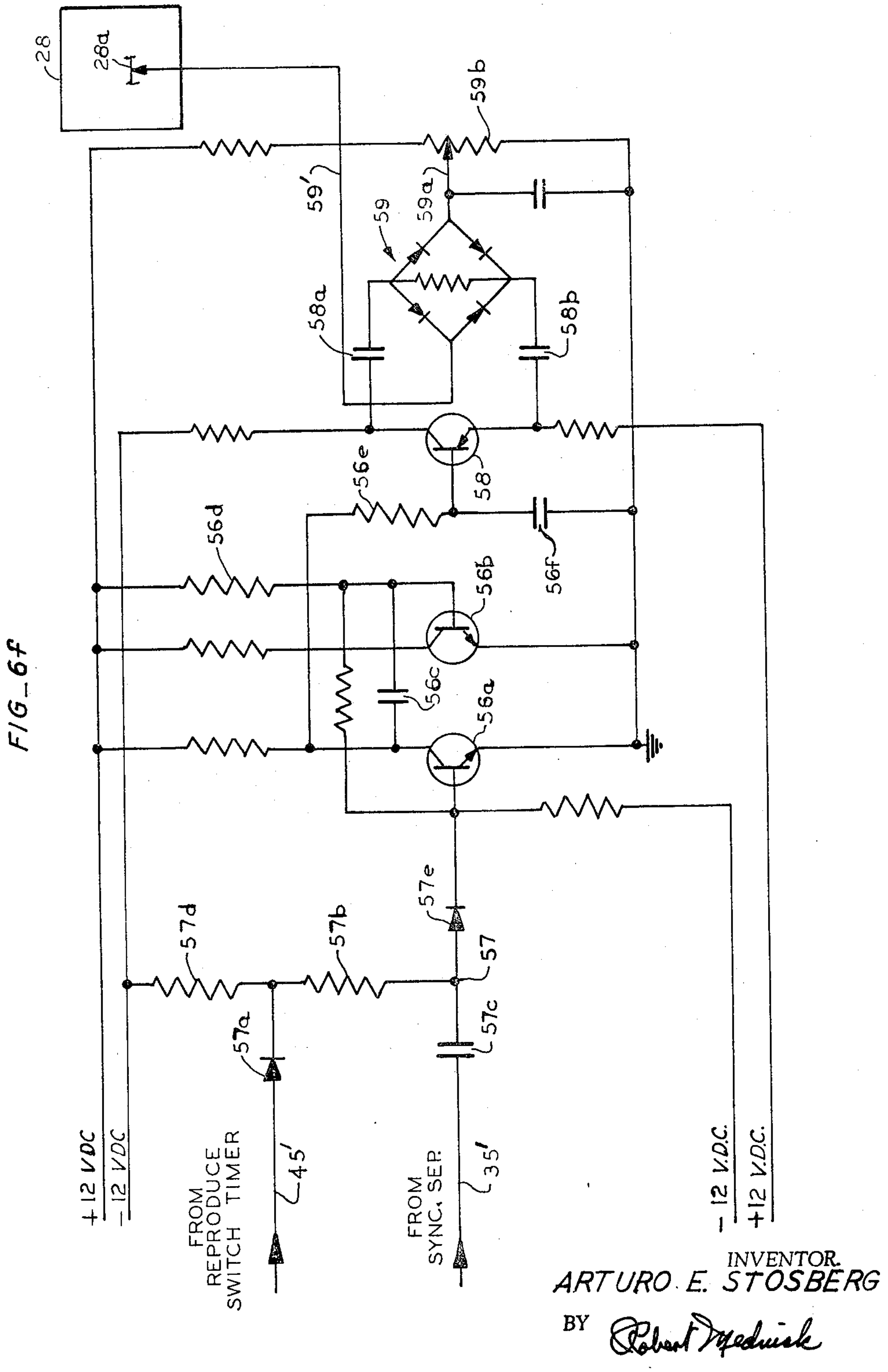

FIG. 6*f* is a schematic circuit diagram of the clamp signal generator shown in block form in FIG. 1.

Figure 7:
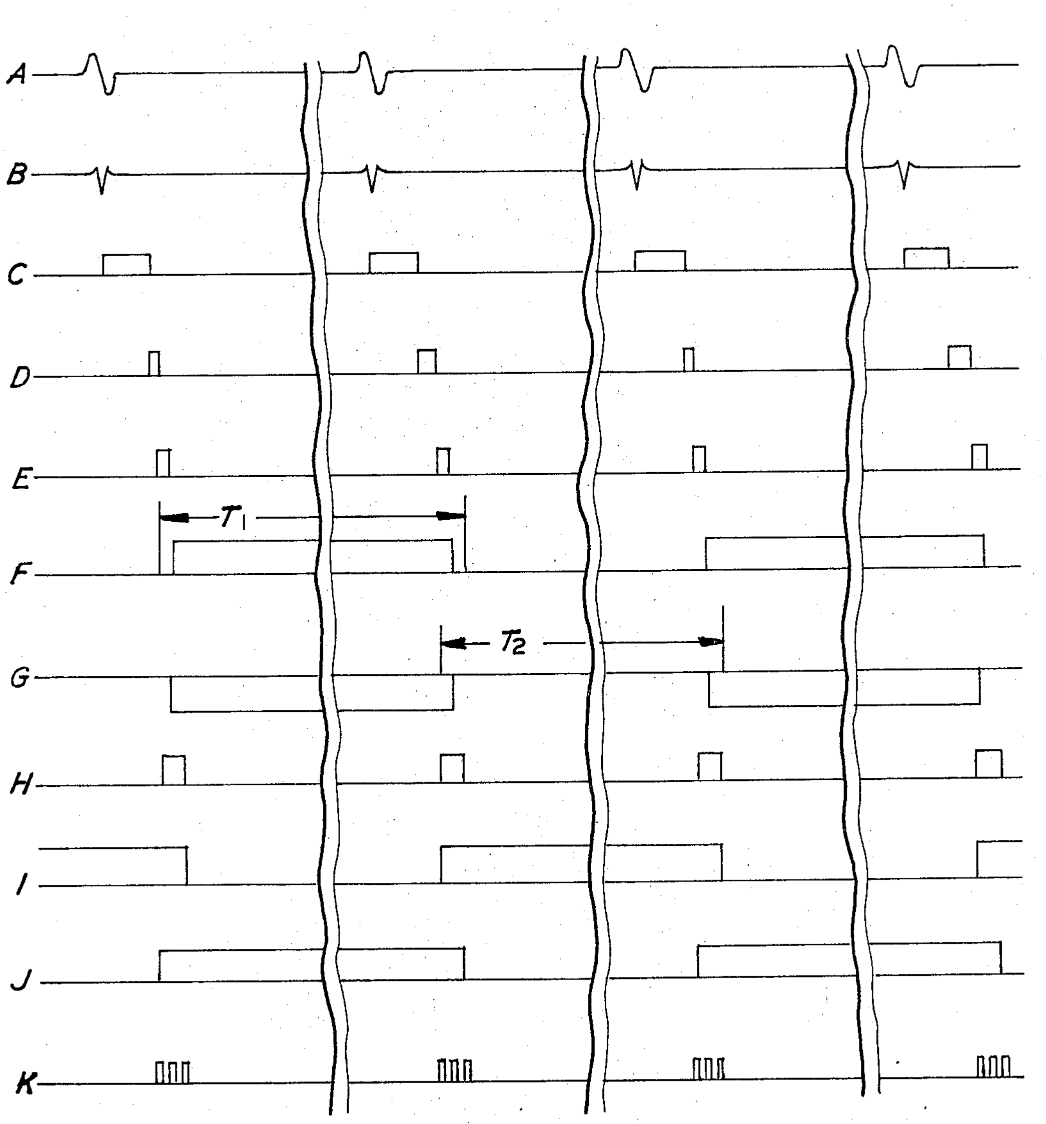

FIG. 7 is a graph generally illustrating the time relation of various waveforms occurring in the circuits shown in FIGS. 6*a* to 6*f*.

Figure 8B:
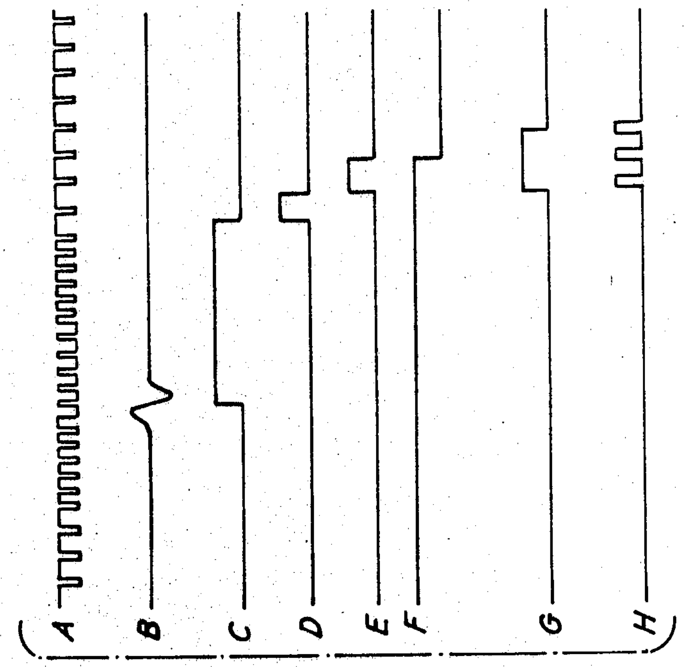
Figure 8A:
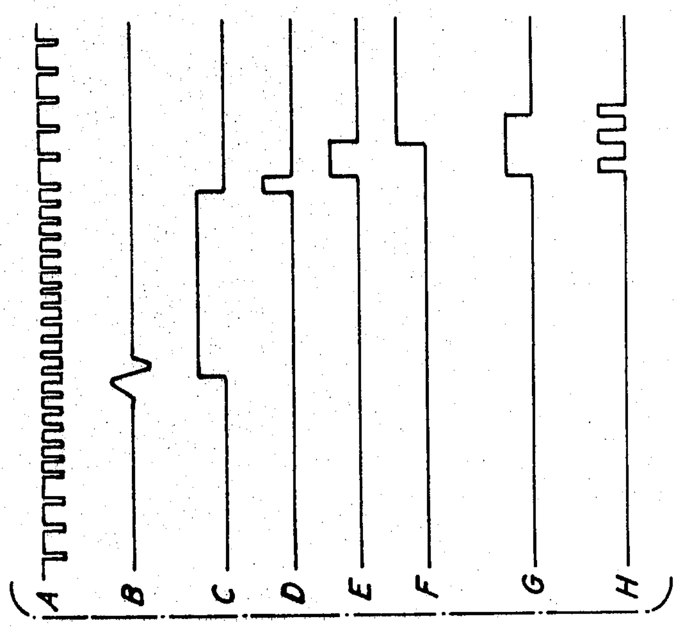

FIG. 8*a* is a graph showing the time relation of the various waveforms occurring in the circuits shown in FIGURES 6*a* to 6*f* with respect to the serrated veritcal synchronization pulse during a vertical blanking period of a composite video signal.

FIG. 8*b* shows a graph similar to that seen in FIG. 8*a* for a succeeding vertical period of a composite video signal having interlaced scanning.

In the video or television art, the term "sync" for brevity purposes is often used for "synchronization," and will also be so used in the following description.

Referring now to the figures, there is seen in FIG. 1 a simplified block diagram of a video recording and reproducing apparatus including a processing system of this invention. A composite television signal may be applied to record circuits 10 via line 10' to modulate a carrier and to be suitably amplified and otherwise prepared for recording thereof. Reproduce circuit 11 is capable of receiving a reproduced signal, then demodulating, amplifying and otherwise suitably preparing the reproduced signal to an output on line 11' such as to a television receiver. A rotary member includes a disc or narrow drum 12 which is rotatable by motor 13, and has magnetic heads disposed thereon to traverse successive diagonal tracks on a magnetic storage member such as magnetic tape. A magnetic tape video recorder and associated mechanism which may be used as a rotary member in this system is shown in copending patent application of Perry Alan Bygdnes, Ser. No. 241,789, filed Dec. 3, 1962, entitled "Tape Recorder" and now abandoned and assigned to the same assignee as this invention. A servo control system 14 is seen connected to motor 13 by dotted lines 13' and operates to control the speed of drum 12 in synchronization with the field rate of the television signal. A suitable servo control system is shown in a copending patent application of Kurt R. Macheim and Uwe W. Reese, Ser. No. 257,483, filed Aug. 15, 1963, entitled "Phase Control System" and assigned to the same assignee as this invention.

Figures 2, 3, 4:
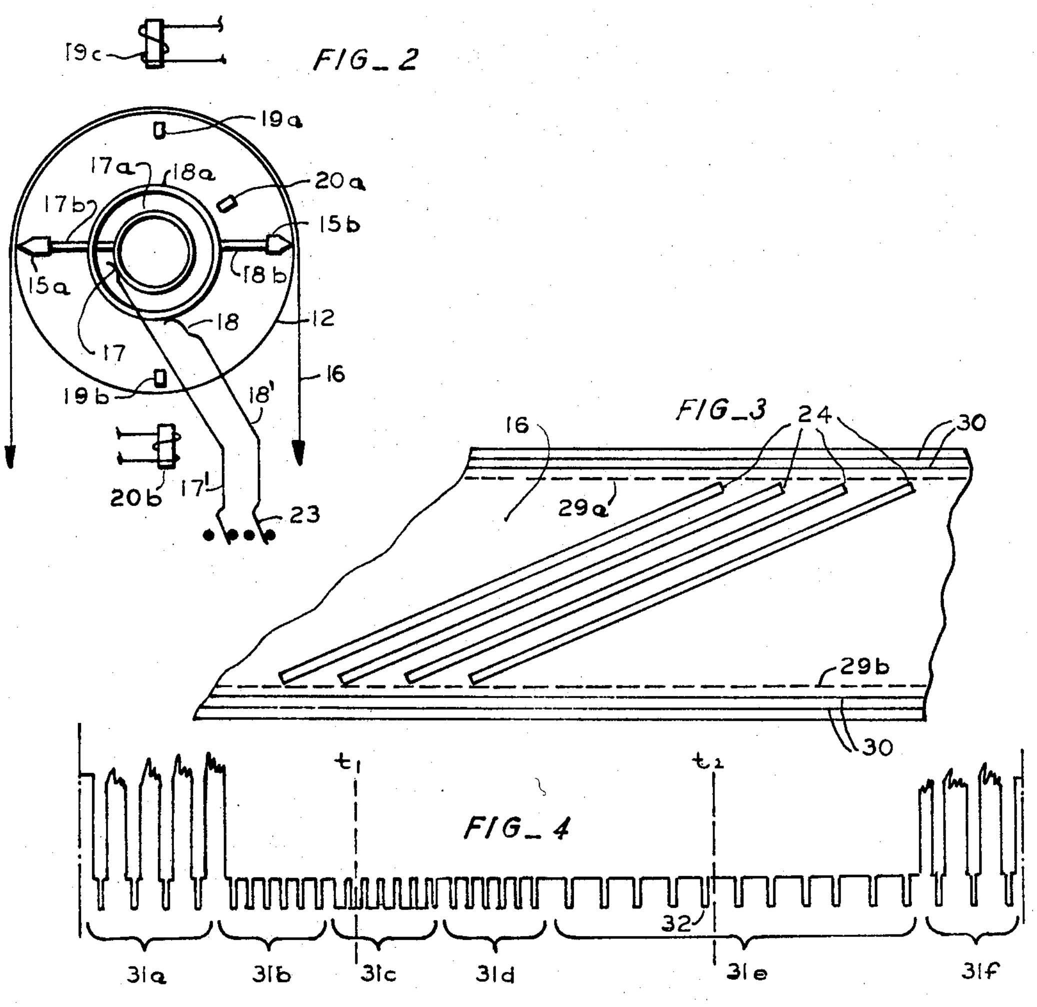
FIG. 2 is a plan view of a rotary member having a pair of magnetic transducer heads used in the embodiment of the invention shown in FIG. 1.
FIG. 3 illustrates a portion of the magnetic tape storage member utilized in the embodiment of FIG. 1 and shows the separated tracks thereon.
FIG. 4 illustrates a portion of a single field of the waveform of a typical composite television signal including horizontal and vertical synchronization signals and a vertical blanking interval.

As seen in more detail in FIG. 2, the rotary member includes disc or drum 12 having two magnetic transducer heads **15*a* and 15*b* comprising the transducer means, said transducer heads are secured at opposite ends of a diameter of said disc, each transducer head being capable of recording or reproducing a television signal on the magnetic tape 16. Line 17' connects to a brush 17 which contacts slip ring 17*a* attached to rotate with disc 12; line 18' connects to a brush 18 which contacts slip ring 18*a* attached to rotate with disc 12. Slip ring 17*a* is connected to transducer head 15*a* by line 17*b*, and slip ring 18*a* is connected to transducer head 15*b* by line 18*b*. Consequently, as disc 12 is rotated, lines 17' and 18' will be electrically connected to transducer heads 15*a* and 15*b*, respectively. A pair of permanent magnets 19*a* and 19*b* are attached to one surface of disc 12 near opposite ends of a diameter and at one radial distance from the center thereof, and a pick up coil 19*c* is positioned adjacent to disc 12 at the same radial disance from the center thereof. Another permanent magnet 20*a* is attached to said surface of disc 12 at another radial distance from the center thereof, and another pick up coil 20*b*** is positioned at said other radial distance from the center thereof.

During the record operation, disc 12 is rotated by motor 13 at a rotational speed equal to the frame rate of the television signal. Magnets **19*a* and 19*b* will induce positioning pulses in coil 19*c* causing two drum pulses to be generated each revolution of disc 12, i.e. at a rate equal to the field rate of the television signal. Servo control system 14 controls the phase or alignment of the rotation of motor 13 with respect to the fields of the composite television signal as described in aforesaid pending patent application. Magnetic tape 16 is caused to move along its length by capstan means (not shown) so that each magnetic head 15*a* and 15*b* traverses diagonal tracks on the magnetic tape 16 to record a single field of a modulated composite video signal on each track. The television signal is applied to record circuit 10 to be prepared for recording. Record switch timer 21 produces gating signals (hereinafter described) to alternately allow the passage of signals from record circuit 10 to lines 22*a* and 22*b* for successive fields of the television signal. Consequently, with switch 23 in the record position, the prepared television signal is alternately applied to heads 15*a* and 15*b*. Accordingly, the continuous composite video signal is recorded on separated tracks 24 on the tape along diagonals thereof as seen in FIG. 3. Each track contains a single field of the television signal. In addition, a record timing reference signal is recorded on a longitudinal track 30 on the magnetic tape 16** for later use during playback.

In playback, switch 23 will be in the position shown in FIG. 1, and magnetic heads **15*a* and 15*b* will sweep across the diagonal tracks 24 recorded on the tape 16. The reproduced modulated composite video signal from heads 15*a* and 15*b* are supplied as an input to preamplifier 25. The output from preamplifier 25 is applied to another amplifier 26, then supplied through conductor 26' to demodulator 27 to be demodulated and supplied through conductor 27' to video output amplifier 28. The video output from amplifier 28 may be utilized by a television broadcast studio for transmission thereof or may be applied to a television receiver or monitor. The preamplifier 25, amplifier 26, demodulator 27, and video amplifier 28 may be of any suitable design and no further description thereof is included herein. The rotation of disc 12 is synchronized with the drum positioning signal induced in pick up coil 19*c* and with the record timing reference signal derived from a longitudinal track 30. Disc or rotary member 12, magnetic tape or storage member 16, and reproduce circuit 11** comprise the reproduce means in the illustrated embodiment of this invention.

Figure 5:
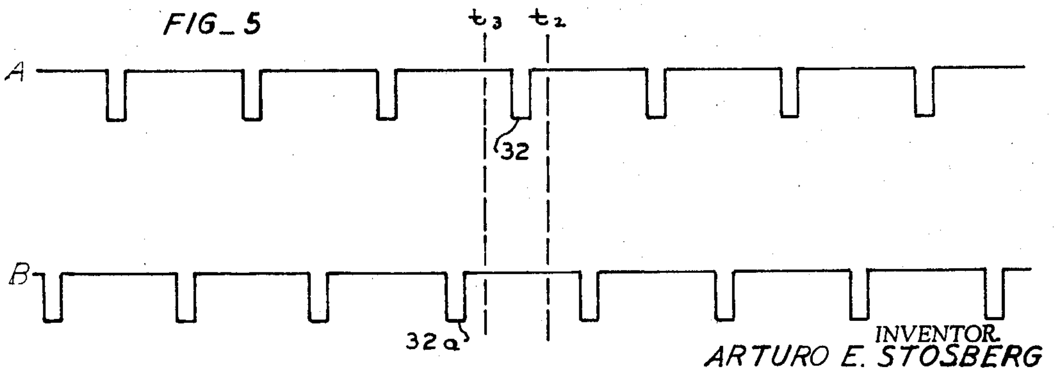
FIG. 5 shows the waveform A thereof an enlargement of a portion of the vertical blanking interval seen in FIG. 4, and shows in waveform B thereof a portion of a vertical blanking interval of an alternate field of a television signal.

As seen in FIG. 3, the recorded tracks 24 extend between margins **29*a* and 29*b* of magnetic tape 16. Between each of the margins 29*a* and 29*b* and the side edges of tape 16, are longitudinal tracks 30 which contain other recorded signals thereon, such as a record timing reference signal on one of these tracks. FIG. 4 illustrates a portion of the waveform of a typical television signal which shows the last few lines 31*a* of a picture signal in a television field, which are consecutively followed by six equalizing pulses 31*b*, a serrated vertical sync pulse 31*c*, another six equalizing pulses 31*d*, several horizontal sync pulses 31*e*, then by several lines 31*f* of the picture signal in the next occurring television field. In the apparatus described, the positioning pulses of the positioning signal picked up by pick up coil 19*c* may occur at time $t_1$ during the serrated vertical sync pulse 31*c*. For the reasons previously stated, delay means are utilized to time the switching during record to occur at time $t_2$ in the vertical blanking period seen in FIG. 4. Waveform A of FIG. 5 shows an enlargement of horizontal sync pulses 31*e* during said vertical blanking period wherein $t_2$ is seen to occur about one-third the distance after a horizontal sync pulse 32. As interlaced scanning is utilized in United States television broadcasting, the horizontal sync pulses during the next occurring vertical blanking period will be displaced a one-half horizontal sync interval. Waveform B of FIG. 5 shows an enlargement of the horizontal sync pulses during such a succeeding vertical blanking period wherein $t_2$ is seen to occur about two-thirds the distance after horizontal sync pulse 32*a*. Now, for example, let us assume that due to the several possible time variances, switching during playback occurs at time $t_3$ rather than $t_2$, it will be realized that horizontal sync pulse 32** will not be picked up during playback. The present invention provides a processing system which overlaps the switching timing during playback to prevent such loss of horizontal sync pulses.

In order to time the switching of each head to occur between horizontal sync pulses and at predetermined overlapping times prior to the beginning and after the end of each recorded track, there is provided in accordance with this invention a reference means, a switch timer 33, and an electronic switch 34. Said reference means includes a sync separator 35, a position signal source 36, and a reference timer 37. The reference timer 37 produces a reference signal timed with respect to horizontal sync after a selected time during each vertical blanking period. The switch timer 33 produces selectively spaced first and second timing signals timed with respect to the reference signal of reference timer 37 to in turn control the overlapping switching time periods during playback. Switch 34 alternately connects each transducer head 15*a* and 15*b* to reproduce circuit 11 at overlapping time periods in accordance with the first and second timing signals of switch timer 33.

A circuit diagram of sync separator 35 of the reference timer is shown in FIG. 6*a*. The sync separator 35 is seen to include an emitter follower stage 35*a* coupled to a clipper amplifier 35*b* feeding into an inverter amplifier 35*c* which is followed by a symmetrical emitter follower 35*d*. The output from video amplifier 28 is seen applied via line 28′ to emitter follower stage 35*a* which provides a high impedance isolating circuit so as not to load video amplifier 28. The output from the emitter of emitter follower stage 35*a* is coupled to clipper amplifier 35*b* which amplifies and passes the sync signal portions of the video signal and removes the video signal thereof. The inverted signal on the collector of clipper amplifier 35*b* is fed to inverter amplifier 35*c* to reinvert the stripped sync signal, which in turn is applied to symmetrical emitter follower 35*d* to again provide a high impedance isolating circuit, whereby the stripped sync signal then appears on line 35′. A portion of the stripped sync signal is shown as waveform A in FIGURES 8*a* and 8*b*.

In FIG. 6*b* there is seen a circuit diagram of the position signal source 36 and the reference timer 37 of the illustrated preferred embodiment of this invention. During rotation of disc 12, a drum positioning signal is picked up by coil 19*c* at the television field repetition rate of 60 cycles per second. The drum positioning signal is shown as waveform A in FIG. 7 for four illustrated consecutive field periods, and is also shown as waveform B in FIGURES 8*a* and 8*b*. The drum positioning signal occurs at time $t_1$ during the serrated vertical sync pulse 31*c* as seen in FIGURE 4. This induced drum positioning signal is applied via line 19′ to first be differentiated by capacitor 38*a* and resistor 38*b* to sharpen this positioning signal as seen in waveform B of FIG. 7, and is then applied to the base of clipper amplifier 39, which only passes the negative peaks of the differentiated positioning signal. The output of clipper amplifier 39 is applied to monostable multivibrator 40.

A monostable or one-shot multivibrator circuit is one that goes through a complete cycle of operation for each received trigger pulse, and then remains quiescent until another trigger pulse is received. In this case, the monostable multivibrator 40 is utilized to provide a predetermined time delay which is determined by the duration of its cycle of operation. In the illustrated circuit, transistor 40*a* is normally non-conducting, and transistor 40*b* is normally conducting. The potential at the collector of transistor 40*b* is then about zero volts D.C. When transistor 40*a* is caused to conduct by the application of the output positioning signal from the collector of clipper amplifier 39, multivibrator 40 will be triggered causing transistor 40*b* to be cut off. Transistor 40*b* will remain in its cut-off condition for a fixed period of time determined essentially by the time constant of capacitor 40*c* and resistances 40*d* and 40*e* (plus other resistances in the condenser discharge path which do not appreciably affect this time period). At this time, the collector of transistor 40*b* is at plus 12 volts D.C. After the lapse of this fixed period, multivibrator 40 will revert to its normal state, and it will remain so until another positioning pulse triggers it again to repeat its cycle of operation. A square wave signal is thereby produced at the collector of transistor 40*b* which is illustrated as waveform C of FIGURES 7, 8*a* and 8*b*. The leading edges of this square wave signal are triggered by the positioning signal developed by coil 19*a*, and the trailing edges are dependent upon the selection of aforesaid circuit constants. In this case, the circuit constants are chosen to cause the trailing edges of the square wave signal to occur during horizontal sync pulses 31*e* as shown in FIG. 4 and waveform C of FIGURES 8*a* and 8*b*. This square wave signal is then differentiated by capacitor 40*f* and resistor 40*g* for developing pulses at the leading and trailing edges of the square wave signal. The negative pulses at the trailing edges of the square wave signal pass through diode 40*h* and appear on line 41 to be applied to reference timer 37.

The reference timer 37 of the reference means as seen in FIG. 6*b* includes a monostable multivibrator 42. In this case, transistor 42*a* is normally non-conducting, and transistor 42*b* is normally conducting. Upon the application of the negative pulses on line 41 to the base of transistor 42*a*, multivibrator 42 will be triggered causing transistor 42*b* to be cut off, and transistor 42*a* to conduct. Thereupon, condenser 42*c* will proceed to discharge through its discharge path through resistor 42*d*. However, as diode 42*e* connects the collector of transistor 42*b* through resistor 42*f* to point 43, the voltage of point 43 will follow the exponential voltage drop on the collector of transistor 42*b*. Point 43 connects through diode 43*a* to the base of transistor 42*b*. Also it is seen, that the stripped sync signal is applied via line 35′ to produce a differentiated sync signal at point 43 because of capacitor 42*g* and resistors 42*f* and 42*h*. At point 43, the leading edges of the stripped sync signal produces negative going pulses and the trailing edges of the sync signal produces positive going pulses. The negative going pulses of the diffferentiated sync signal are not of themselves of sufficient magnitude to trigger transistor 42*b* into conduction. However, since diode 42*e* allows the voltage on point 43 to follow the discharge curve of capacitor 42*c*, one of the negative going pulses added to the discharge voltage on point 43 will trigger transistor 42*b* into conduction, thereby causing it to revert to its normal stable operating condition at the occurrence of the leading edge of a horizontal sync signal. Accordingly, monostable multivibrator 42 operates as a conventional bistable flip-flop circuit in this arrangement, wherein a square wave is initiated by a negative trigger pulse on line 41, and is terminated by a negative pulse on point 43. The positive going square wave output of multivibrator 42 is taken from the collector of transistor 42*a* via line 42*i*, and is seen as waveform D in FIGURES 7, 8*a* and 8*b*. Accordingly, this waveform on line 42*i* is a reference signal timed with respect to horizontal sync after a selected time during each vertical blanking period. It will be noted that the trailing edges of this waveform occurs at the leading edges of horizontal sync; and for a television signal with interlace scanning, the duration of the alternate square waves of the waveform will therefore vary by a one-half horizontal sync interval.

Referring now to FIG. 6*c*, there is shown therein the reproduce switch timer 33 for producing a first and second timing signal during each vertical blanking period. The waveform on line 42*i* from reference timer 37 is differentiated by capacitor 44*a* and resistor 44*b* to develop pulses at the leading and trailing edges thereof; the pulses at the trailing edges pass through diode 44*c* to monostable multivibrator 45. The first stage of multivibrator includes a transistor 45*a* which is normally cut off, and the second stage thereof include a transistor 45*b* which is normally conducting. Upon the application of the negative pulses through diode 44*c* to the base of transistor 45*a*, multivibrator 45 will be triggered whereby transistor 45*a* conducts and transistor 45*b* doesn't conduct. The period of the cycle of operation of multivibrator 45 depends upon the discharge path of capacitor 45*c* which is essentially determined by the time constant of capacitor 45*c* and resistor 45*d*. Thereafter, multivibrator 45 will revert to its normal stable state. The square wave output signal from multivibrator 45 appearing on 45′ is taken from the collector of transistor 45*a* and is shown as waveform H in FIG. 7 and as waveform G in FIGURES 8*a* and 8*b*.

As was previously stated, it is desired to switch on each transducer head prior to the beginning of each track being scanned, and to switch off said head a short period after the end of each track. The period of overlap of each head is selected to cover the range of variances in record and playback switching. Assuming the variances that actually exist cover a range of plus or minus one horizontal sync period of the television signal, then the time constant of capacitor 45c and resistor 45d will be set to cover a little over two horizontal sync periods, e.g. about 2.2 horizontal sync periods. It will also be realized that the leading edges of the square wave on line 45' provides a first timing signal, and the trailing edges of the square wave on line 45' provides a second timing signal, the period between the first timing signal and the second timing signal is the selected overlap period to cover the range of time switching variances due to several causes in the record and playback switching times.

Referring now to FIG. 6d there is seen a schematic circuit diagram of the switch 34 to develop overlapping gating signals for electrically connecting each of transducers 15a and 15b to reproduce circuit 11 in accordance with the first and second timing signals received from switch timer 33. Switch 34 is seen to include another multivibrator delay circuit 47 followed by a record switch timer 48 to first produce a gating signal to switch during record. The record gating signal from record switch timer 48 is thereupon combined with the first and second timing signals received from switch timer 33 in adder 49 in order to produce a reproduce gating signal which is delayed by delay circuit 50. The output from delay circuit 50 is applied to preamplifier 25 of reproduce circuit 11 in order to selectively time the overlapping of switching.

As seen in FIG. 6d, the square wave signal on line 42i from reference timer 37 is first differentiated by capacitor 46a and resistor 46b to produce positive going pulses at the leading edges, and negative going pulses at the trailing edges of the reference signal on line 42i. A monostable multivibrator 46 is seen to include transistor 46c which is normally non-conducting and a transistor 46d which is normally conducting. Upon the application of the negative going pulses developed across resistor 46b to the base of transistor 46c, the multivibrator 46 will be triggered to cause transistor 46c to conduct and transistor 46d to be cut off. The period of the cycle of operation of multivibrator 46 depends upon the discharge path of capacitor 46e which is essentially determined by the time constant of capacitor 46e and resistor 46f. Thereafter, multivibrator 46 will revert to its normal stable state. The square wave output signal from multivibrator 46 appearing on the collector of transistor 46c is shown as waveform E in FIGURES 7, 8a, and 8b. The period of this square wave output signal is set for about one-half of the period of the square wave produced by multivibrator 45 of switch timer 33, or about 1.1 times the horizontal period of the television signal. The square wave signal on line 46' is then seen to be differentiated by capacitor 51a and resistor 51b to produce positive going pulses at the leading edges thereof and negative going pulses at the trailing edges thereof across resistor 51b. The signal across resistor 51b is applied to the base of transistor 52 which is connected only to pass the negative going pulses which appear in inverted form (i.e. as positive pulses) on its collector. Thereupon, these positive pulses are applied to record switch timer 48 through D.C. isolating diodes 52a and 52b via lines 52c and 52d.

The record switch timer 48 includes a conventional bistable multivibrator having a first stage including transistor 48a and a second stage including transistor 48b. As is well known, a bistable multivibrator is a two-stage direct coupled amplifier with the output of the second stage feeding back to the input of the first stage. One stage is conducting while the other stage is non-conducting. Trigger pulses applied to each stage can reverse the conduction and non-conduction of the stages. The positive pulses on lines 52c and 52d are applied to the collectors of both transistors 48a and 48b. Accordingly, each positive pulse will change the operating condition of the bistable multivibrator and trigger the non-conducting stage into conduction and the conducting stage to be cut off. The bistable multivibrator will therefore produce square wave signals of opposite polarities on lines 48' and 48'', which are seen as waveform F in FIGURES 7, 8a, and 8b, and as waveform C in FIG. 7, respectively. These square waveforms are the gating signals which are applied to amplifiers 10a and 10b of record circuit 10. It will be noted that the leading and trailing edges of these gating signals are selected to occur at a time in between horizontal sync pulses of horizontal sync pulses 31e during the vertical blanking period as seen in FIG. 4.

It will be realized that the polarity of the square wave output on lines 48' and 48'' has to be controlled so that when one or the other of transducer heads 15a and 15b are scanning a track, at that time either the record circuit or the reproduce circuit (as the case may be) is electrically connected to the scanning transducer head. Since the bistable multivibrator of switch timer 48 cannot distinguish between the incoming triggering pulses, it may operate in the reverse state than that desired. To prevent this from occurring, magnet 20a induces a polarity correcting pulse in coil 20b causing a single pulse to be generated each revolution of disc 12, i.e. at a rate equal to the frame rate of the television signal. This polarity correcting pulse is applied via line 53' to be differentiated by capacitor 53a and resistor 53b. The peaks of the differentiated negative pulses appearing across resistor 53b are amplified by transistor 53 producing inverted positive pulses on its collector. These inverted positive pulses are applied to the collector of transistor 48b which are also capable of triggering it into the desired operating condition, so that the proper transducer head is electrically connected to the record or reproduce circuits (as the case may be) when scanning the tracks on the tape 16. It will also be realized, that thereafter the correcting pulses on line 53' will be ineffective to change the operating state of the bistable multivibrator of switch timer 48 as it will be then applied when transistor 48b is conducting.

The square wave gating signals on lines 48' and 48'' are then also applied to diodes 49a and 49b, respectively, in adder circuit 49, while at the same time the overlap square wave signal from switch timer 33 is applied to both diodes 49c and 49d via line 45'. Considering first the square wave gating signal applied to diode 49a, it will be realized that during the absence of overlap square wave signal on line 45', the D.C. voltage on line 45' is approximately minus 12 volts. During the existence of the positive directed waveform signal on line 48' the D.C. potential at diode 49a is about zero volts since transistor 48a is conducting. Accordingly, the D.C. voltage on diode 49a is positive with respect to the D.C. voltage on diode 49c, and diode 49a will conduct causing current flow in line 54a. Now, during the absence of the positive directed square waveform signal (i.e. during negative directed portions thereof) on line 48', the D.C. voltage on diode 49a is about minus 12 volts, and no current will flow through diode 49a. However, during the absence of the said positive directed square waveform signal on line 49a and during the existence of the overlap square wave signal on line 45' (the D.C. voltage on line 45' is then about zero), line 45' is now positive with respect to line 48', current will flow through diode 49c. Accordingly, current will flow in line 54a during the periods designated as $T_1$ in waveform F of FIG. 7 producing an extended waveform signal as seen in waveform J of FIG. 7. Considering now the square wave signal applied to diode 49b via line 48'' during the existence of its positive directed waveform signal, it will be realized that the D.C. potential at diode 49b is then about zero volts since transistor 48b is conducting. During the absence of the overlap square wave signal on line 45', the D.C. voltage on diode 49b is positive with respect to the D.C. voltage on diode 49d, and diode 49b will conduct causing current flow in line 54b. Also during the absence of the positive directed waveform signal on line 48'' and during the existence of the overlap square wave signal on line 45', the D.C. voltage on diode 49d is positive with respect to the D.C. voltage on diode 49b, and diode 49d will conduct causing current flow in line 54b. Accordingly, current will flow in line 54b during the periods designated as $T_2$ in waveform G of FIG. 7 producing an extended waveform signal as seen in waveform I of FIG. 7. Consequently, the waveform signals on lines 54a and 54b have extended positively directed square waves on both leading and trailing edges thereof to provide overlap reproduce switching periods.

The overlapping gating signals on lines 54a and 54b are applied to delay circuit 50, which comprises resistor 50a, capacitor 50b, resistor 50c, and capacitor 50d. The signal on line 54a is slightly delayed by resistor 50a and capacitor 50b to cause the leading edges of these waveforms to clear the simultaneously occurring trailing edges of the horizontal sync pulses of the television signal so that any switching transients will not disturb the horizontal sync pulses. Similarly and for the same reason, the signal on line 54b is delayed by resistor 50c and capacitor 50d.

Referring now to FIG. 6e wherein is shown an example of a gating circuit that may be used in the preamplifier 25 in order to electrically connect the transducer heads 15a and 15b to the reproduce circuit 11 during the positively directed waveform signals on lines 55a and 55b from delay 50. The output of transducer heads 15a and 15b are connected to lines 25a and 25b, respectively, through mechanical switch 23. The signal on line 25a is coupled through capacitor 55c to be fed into the base of transistor 55d, and the signal on line 25b is coupled through capacitor 55e to be fed into the base of transistor 55f. The collectors of transistors 55d and 55f are connected together into a common output line 55' which is applied to a conventional amplifier circuit of the preamplifier 25 for suitable amplification. The time over-lapping gating signals are simultaneously applied to the emitters of transistors 55d and 55f to provide forward bias thereto allowing them to conduct only during the existence of these positively directed gating signals. As each transistor 55d and 55f will be forward biased only during the existence of these positively directed gating signals on its emitters, the signals on lines 25a and 25b will only pass through these transistors during the application thereto of these gating signals.

Referring now to FIG. 6f, there is seen a schematic circuit diagram of a clamp signal generator 56. The square wave signal from the reproduce switch timer 33 is applied from line 45' through D.C. isolating diode 57a through resistor 57b to point 57. Also, the sync pulses from sync separator 35 are differentiated by capacitor 57c and resistors 57b and 57d to produce negative pulses at the leading edges and positive pulses at the trailing edges of the sync pulses at point 57. A conventional one-shot multivibrator circuit is seen to include transistor 56a and transistor 56b. The time constant of capacitor 56c and resistor 56d of this multivibrator circuit is set to about one-half of a horizontal sync period. Diode 57e will only be operative to pass the positive pulses from line 35' when receiving an overlap square wave signal through line 45'. During the existence of this square wave signal, the potential at point 57 as a result thereof is about zero volts; during the absence of this square wave signal the potential at point 57 as a result thereof is minus 12 volts D.C. Accordingly, during the existence of the square wave signal on point 57, the positive pulses from the differentiated sync signal on point 57 pass through diode 57e to trigger this multivibrator into operation. In the above described circuitry, three positive pulses will occur during each square wave signal from switch timer 33. Each of these three positive pulses will trigger the monostable multivibrator to produce clamping timing pulses as seen in waveform K of FIG. 7 and waveform H of FIGURES 8a and 8b. These clamping timing pulses taken from the collector of transistor 56a are delayed for a small fraction of a horizontal sync period of a television signal by resistor 56e and capacitor 56f. The length of this delay is that time to cause the leading edges of the clamp timing pulses to clear the horizontal sync pulses (preferably to clear the back porch interval of the horizontal sync pulses) and to occur prior to the time of switching. Then these clamping timing pulses are applied to transistor 58 to produce oppositely phased pulses applied to capacitors 58a and 58b respectively. A conventional diode bridge gating circuit is designated as 59 which allows conduction from arm 59a of potentiometer 59b through line 59' during the existence of the clamping timing pulses. The D.C. voltage on arm 59a is set to equal the D.C. voltage in video amplifier 28 at the blanking level of the television signal. As a result, clamp blanking pulses are produced on line 59' which only exist in between horizontal sync pulses and which occur for all possible switching times, during record as well as playback. These blanking pulses are applied to line 28a within video amplifier 28 where the reproduced composite video signal is fed from one stage to another in video amplifier 28. Accordingly, if the blanking level of the composite video signal on line 28a tends to vary from the normal blanking level during the existence of these clamping pulses, then the voltage level of the clamp blanking pulses on line 59' will prevent any such excursions from occurring, thereby clamping out switching transients. It is of course understood, that if the voltage of the blanking level in the reproduced video signal varies, then instead of a constant voltage being applied to line 59a as described, a varying voltage equal to the varying voltage of the blanking level could then be supplied to line 59a by means well known in the art.

In considering the operation of the described apparatus, first let us examine its operation during record. The rotary member including disc 12 is rotated by motor 13, the phase and frequency of which is controlled by servo control system 14 to synchronize the speed of disc 12 with the field rate of the television signal being recorded. Since two transducer heads are seen carried by disc 12, and it is desired to record a single field of the television signal on each track on magnetic tape 16, the rotational speed of disc 12 will be caused to be equal to the frame rate of the television signal, i.e. 60 cycles per second. As magnetic tape 16 is moved along its length, successive tracks 24 will be scanned by transducer heads 15a and 15b. Then, with switch 23 in its record position and upon the application of a television signal to input line 10', record circuit 10 will prepare the television signal for application to the transducer heads 15a and 15b.

The input television signal is also fed into sync separator 35 via line 60 to produce a stripped sync signal on line 35'. At the same time the positioning pulses derived by coil 19a (waveform A of FIG. 7 and waveform B of FIGURES 8a and 8b) are applied to position signal source 36 via line 19' to be differentiated (waveform B of FIG. 7) to develop a square wave signal (waveform C of FIGURES 7, 8a and 8b) having trailing edges occurring near but prior to the selected time during horizontal sync pulses 31e of the vertical blanking period of the television signal. The trailing edges of the square wave signal on line 41 are caused to trigger a multivibrator 42 in reference timer 37 to initiate a square wave signal seen as waveform D in FIGURES 7, 8a and 8b. The stripped sync signal applied via line 35' to reference timer 31 trigger multivibrator 42 back into its stable state at the occurrence of the leading edges of the stripped horizontal sync signal, thereby terminating the square wave signal seen as waveform D in FIGURES 7, 8a and 8b. Accordingly, it will be realized that waveform D of FIGURES 7, 8a and 8b provides a reference signal having trailing edges timed with respect to a horizontal sync pulse during horizontal sync pulses 31e of each vertical blanking period of the television signal. The reference signal from reference timer 37 is fed into delay 47 via line **42*i*** to produce a square wave signal (waveform E of FIGURES 7, 8*a* and 8*b*). After being differentiated, the pulse formed from the trailing edges of said square wave signal (waveform E of FIGURES 7, 8*a* and 8*b*) pass through lines **52*c* and 52*d* to be applied to trigger the bistable multivibrator in record switch timer 48. The bistable multivibrator in record switch timer 48** thereupon provides a record gating signal seen as waveforms F and G in FIG. 7 (waveform F of FIG. 7 is also shown as waveform F of FIGURES 8*a* and 8*b*). The correcting pulses picked up by coil **20*b* and also applied to the multivibrator of record switch timer 48 to desirably phase its square wave signal output. The record gating signal from record switch timer 48 is applied to amplifiers 10*a* and 10*b* of record circuit 10, respectively, to alternately connect and disconnect transducers 15*a* and 15*b* from the signal output of record circuit 10. Accordingly, transducer heads 15*a* and 15*b* will record each successive field of the input television signal on successive separated tracks 24 on magnetic tape 16** as shown in FIG. 3.

Now, considering the operation of the described apparatus during playback, switch 23 will then be in the position shown in FIG. 1 to feed the signals picked up by transducer heads **15*a* and 15*b* to reproduce circuit 11 via lines 25*a* and 25*b* respectively. As the magnetic tape 16 is moved at the same speed as during record, the rotary member will be rotated by motor 13 which is controlled by servo control system 14 to synchronize the speed of disc 12 with the record timing reference signal on track 30. The reproduced television signal on line 28′ is applied to sync separator 35 to produce a stripped sync signal on line 35′. Thereafter waveforms A, B, C, D, E, F, and G of FIGURE 7 are produced by coil 19*a*, position signal source 36, reference timer 37, delay 47, and record switch timer 48, as previously described during the record operation. However, during playback, reproduce switch timer 33, adder 49, and delay 50 are also used to develop an overlapping reproduce switching signal to be applied to reproduce circuit 11, and clamp signal generator 56** is also utilized to develop a series of clamp timing pulses during each of the overlapping reproduce switching periods.

The reference signal on line **42*i* is applied to reproduce switch timer 33 so that its multivibrator 45 is triggered on at the trailing edges of the reference signal. Multivibrator 45 produces a square wave signal initiated by the reference signal, and which has a period of about 2.2 times the horizontal sync period (i.e. a little more than the extent of possible variances in switch timing which has been stated to be about plus or minus one horizontal sync period). The square wave signal output on line 45′ from reproduce switch timer 33** is seen as waveform H of FIG. 7 and as waveform G of FIGURES 8*a* and 8*b*. This square wave signal on line 45′ is added to the record square wave signal developed by record switch timer 48 in adder 49 as previously described to produce overlapping square wave gating signals on lines **54*a* and 54*b* as seen in waveforms I and J respectively in FIG. 7. Thereafter, the signals on lines 54*a* and 54*b* are delayed by delay 50 so that its leading edges occur a desired time in between the horizontal sync pulses of the television signal, and are applied to pre-amplifier 25 of reproduce circuit 11. Accordingly, it will be realized that as the gating signals on lines 55*a* and 55*b* overlap about 2.2 horizontal sync periods, i.e. start a little over a horizontal sync period prior to the beginning of tracks 24, and end a little over a horizontal sync after the end of tracks 24, then each of the transducer heads 15*a* and 15*b* will be connected to the reproduce circuit 11** for these overlapping periods. Consequently, during playback, not only will the recorded television signal be combined in the original time sequence to accurately reproduce the original television signal, but differences in timing of switching during record and playback will not result in loss of any horizontal sync pulses.

It was stated that due to timing variances, switching during record may vary for example, plus or minus one horizontal sync period from that during playback. The overlapping periods of the square wave gating signal applied to reproduce circuit 11 cover this range of timing variances. Now, as is well known, electrical or electronic switching produces switching transients at the time of switching. The switching occurring during playback produces two switching transients during each vertical blanking period, one at the beginning of each square wave gating signal to switch on one transducer head, and one at the end of each square wave gating signal to switch off the other transducer head. The record switching transient will occur either at about the same time of one of the playback switching transients, or in between them. It is desirable to eliminate all switching transients. For this purpose, clamp signal generator 56 is provided to produce a series of clamp blanking pulses during each vertical blanking period (in this example, three of them). In the clamp signal generator, the stripped sync signal on line 35′ from sync separator 35 is differentiated to produce pulses at the trailing edges of the horizontal sync signal to trigger a multivibrator only during the reproduce overlap switching period. As a result, three clamp timing pulses are produced each vertical sync period. The clamp timing pulses from this multivibrator are delayed as previously described, and each of these three clamp timing pulses are caused to have a duration less than a horizontal sync period. These clamp timing pulses are applied to bridge switch 59 (of FIG. 6*f*) to allow the passage therethrough of a clamping voltage only during the existence of these clamp timing signals. The clamping voltage equals that of the blanking level of the television signal in video amplifier 28, and causes the blanking level to be maintained at this voltage level during their application to video amplifier 28. Consequently, the clamp timing pulses produce correspondingly timed clamp blanking pulses which are utilized to clamp out any excursions from the blanking level of the television signal during the existence of these clamp blanking pulses, thereby eliminating switching transients.

In the above description, the indicated polarities, voltages levels, and waveforms were made for the purpose of illustrating particular circuitry. As is well understood, the invention is not limited to this specific illustration.

Having herein described the invention, what is claimed as new is:

1. A processing system for an apparatus reproducing a composite video signal with a horizontal sync signal of horizontal sync pulses and with a vertical sync signal during vertical blanking periods, single fields of the composite video signal being recorded on separated successive tracks on a storage member, said processing system comprising: reproduce means including a reproduce circuit and a plurality of transducer heads to reproduce the signal recorded on the separated tracks; and an electronic switch being connected to the reproduce circuit for alternately connecting and disconnecting the reproduce circuit from the transducer heads, said switch connecting one transducer head to the reproduce circuit at a selected time during each vertical blanking period, and said switch disconnecting another transducer head to the reproduce circuit at another selected subsequent time during each vertical blanking period, in order to simultaneously connect both of said transducer heads to the reproduce circuit during a predetermined overlapping time period of each vertical blanking period.

2. The processing system as defined in claim 1 which additionally includes: a clamp signal generator connected to the switch and to the reproduce means to produce a series of clamp blanking pulses during each vertical blanking period, said series of clamp blanking pulses occurring in between all horizontal sync pulses starting from the horizontal sync pulse prior to when a transducer head is switched on up to the horizontal sync pulse after another transducer head is switched off, in order to maintain the blanking level of the video signal in said reproduce means during the existence of the clamp blanking pulses.

3. The processing system as defined in claim 1 which additionally includes: a clamp signal generator connected to the switch and to the reproduce means to produce a plurality of clamp blanking pulses timed by the horizontal sync signal of the video signal to occur in between all horizontal sync pulses starting from the horizontal sync pulse prior to when a transducer head is switched on up to the horizontal sync pulse after another transducer head is switched off, said plurality of clamp blanking pulses being applied to the reproduce means to prevent excursions from the blanking level of the video signal during the existence of the clamp blanking pulses in order to eliminate switching transients.

4. A processing system for an apparatus reproducing a composite video signal with a horizontal sync signal of horizontal sync pulses and with a vertical sync signal during vertical blanking periods, single fields of the composite video signal being recorded on separated successive tracks on a storage member, said processing system comprising: reproduce means including a reproduce circuit and a plurality of transducer heads to reproduce the signal recorded on the separated tracks; a record switch timer connected to the reproduce circuit for producing a record switch signal capable of being used to simultaneously switch transducer heads during record; and an electronic reproduce switch being connected to the reproduce circuit and to the record switch timer for alternately connecting and disconnecting the reproduce circuit from the transducer heads, said switch connecting one transducer head to the reproduce circuit prior to the occurrence of the record switch signal, and said switch disconnecting another transducer head from the reproduce circuit after the occurrence of the record switch signal, in order to simultaneously connect both of said transducer heads to the reproduce circuit during an overlapping time period beginning prior to and ending after the record switch signal of each vertical blanking period.

5. The processing system as defined in claim 4 which additionally includes: a clamp signal generator connected to the reproduce switch and to the reproduce means to produce a series of clamp blanking pulses during each vertical blanking period, said series of clamp blanking pulses occurring in between all horizontal sync pulses starting from the horizontal sync pulse prior to when a transducer head is switched on up to the horizontal sync pulse after another transducer head is switched off, in order to maintain the blanking level of the video signal in said reproduce means during the existence of the clamp blanking pulses.

6. The processing system as defined in claim 4 which additionally includes: a clamp signal generator connected to the reproduce switch and to the reproduce means to produce a plurality of clamp blanking pulses timed by the horizontal sync signal of the video signal to occur in between all horizontal sync pulses starting from the horizontal sync pulse prior to when a transducer head is switched on up to the horizontal sync pulse after another transducer head is switched off, said plurality of clamp blanking pulses being applied to the reproduce means to prevent excursions from the blanking level of the video signal during the existence of the clamp blanking pulses in order to eliminate switching transients.

7. A processing system for an apparatus reproducing a composite video signal with a horizontal sync signal of horizontal sync pulses and with a vertical sync signal during vertical blanking periods recorded on separated successive tracks on a storage member, said processing system comprising: reproduce means including a reproduce circuit and a plurality of transducer heads to reproduce the signal recorded on the separated tracks; a switch timer connected to said reproduce circuit for producing selectively spaced first occurring and second occurring timing signals during each vertical blanking period, each timing signal being timed with respect to the horizontal sync signal of the video signal; and a switch connected to the switch timer and to the reproduce means for alternately connecting and disconnecting its reproduce circuit from the transducer heads, said switch being timed by the first occurring timing signal to electrically connect one transducer head to the reproduce circuit, and said switch being timed by the second occurring timing signal to electrically disconnect another transducer head from the reproduced circuit, in order to simultaneously connect both of said transducer heads to the roproduce circuit during a predetermined overlapping time period of each vertical blanking period.

8. The processing system as defined in claim 7 which additionally includes: a clamp signal generator connected to the switch timer and to the reproduce means to produce a series of clamp blanking pulses during each vertical blanking period, said series of clamp blanking pulses occurring in between all horizontal sync pulses starting from the horizontal sync pulse prior to when a transducer head is switched on up to the horizontal sync pulse after another transducer head is switched off, in order to maintain the blanking level of the video signal in said reproduce means during the existence of the clamp blanking pulses.

9. The processing system as defined in claim 7 which additionally includes: a clamp signal generator connected to the switch timer and to the reproduce means to produce a plurality of clamp blanking pulses timed by the said first occurring and said second occurring timing signals of the switch timer and timed by the horizontal sync signal of the video signal to occur in between all horizontal sync pulses starting from the horizontal sync pulse prior to when a transducer head is switched on up to the horizontal sync pulse after another transducer head is switched off, said plurality of clamp blanking pulses being applied to the reproduce means to prevent excursions from the blanking level of the video signal during the existence of the clamp blanking pulses in order to eliminate switching transients.

10. A processing system for an apparatus reproducing a composite video signal with a horizontal sync signal of horizontal sync pulses and with a vertical sync signal during the vertical blanking periods recorded on separated successive tracks on a storage member, said processing system comprising: reproduce means including a reproduce circuit and a plurality of transducer heads to reproduce the signal recorded on the separated tracks; a reference means for producing a reference signal timed with respect to a horizontal sync pulse during each vertical blanking period; a reproduce switch timer connected to said reference means to produce selectively spaced first occurring and second occurring timing signals during each vertical blanking period; and a switch connected to the reproduce switch timer and to the reproduce means for alternately connecting and disconnecting its reproduce circuit from the transducer heads, said switch being timed by the first occurring timing signal to electrically connect one transducer head to the reproduce circuit, and said switch being timed by the second occurring timing signal to electrically connect another transducer head to the reproduce circuit, in order to simultaneously connect both of said transducers to the reproduce circuit during a predetermined overlapping time period of each vertical blanking period.

11. The processing system as defined in claim 10 which additionally includes: a clamp signal generator connected to the switch timer and to the reproduce means to produce a series of clamp blanking pulses during each vertical blanking period, said series of clamp blanking pulses occurring in between all horizontal sync pulses starting from the horizontal sync pulse prior to when a transducer head is switched on up to the horizontal sync pulse after another transducer head is switched off, in order to maintain the blanking level of the video signal in said reproduce means during the existence of the clamp blanking pulses.

12. The processing system as defined in claim 10 which additionally includes: a clamp signal generator connected to the switch timer and to the reproduce means to produce a plurality of clamp blanking pulses timed by the said first occurring and said second occurring timing signals of the reproduce switch timer and timed by the horizontal sync signal of the video signal to occur in between all horizontal sync pulses starting from the horizontal sync pulse prior to when a transducer head is switched on up to the horizontal sync pulse after another transducer head is switched off, said plurality of clamp blanking pulses being applied to the reproduce means to prevent excursions from the blanking level of the video signal during the existence of the clamp blanking pulses in order to eliminate switching transients.

13. A processing system for an apparatus reproducing a composite video signal with a horizontal sync signal of horizontal sync pulses and with a vertical sync signal during the vertical blanking periods, said processing system comprising: a storage member having a continuous video signal recorded on successive tracks thereon; a rotary member carrying a pair of transducer heads to consecutively scan the successive tracks on the storage member and reproduce the recorded signal thereon; a reproduce circuit for receiving the reproduced signal from the transducers of the rotary member and forming a desired output therefrom; a reference means for producing a reference signal timed with respect to a horizontal sync pulse during each vertical blanking period; a reproduce switch timer connected to said reference means to produce selectively spaced first occurring and second occurring timing signals during each vertical blanking period; and a switch connected to said pair of transducer heads and to the reproduce circuit for alternately connecting and disconnecting the reproduce circuit from the transducer heads, said switch being connected to the reproduce switch timer to be timed by the first occurring timing signal to electrically connect one transducer to the reproduce circuit, and to be timed by the second occurring timing signal to electrically disconnect the other transducer head to the reproduce circuit, in order to simultaneously connect both of said transducer heads to the reproduce circuit during a predetermined overlapping time period of each vertical blanking period.

14. The processing system as defined in claim 13 which additionally includes: a clamp signal generator connected to the switch timer and to the reproduce circuit to produce a series of clamp blanking pulses during each vertical blanking period, said series of clamp blanking pulses occurring in between all horizontal sync pulses starting from the horizontal sync pulse prior to when a transducer head is switched on up to the horizontal sync pulse after another transducer head is switched off, in order to maintain the blanking level of the video signal in said reproduce circuit during the existence of the clamp blanking pulses.

15. The processing system as defined in claim 13 which additionally includes: a clamp signal generator connected to the switch timer and to the reproduce circuit to produce a plurality of clamp blanking pulses timed by the said first occurring and said second occurring timing signals of the reproduce switch timer and timed by the horizontal sync signal of the video signal to occur in between all horizontal sync pulses starting from the horizontal sync pulse prior to when a transducer head is switched on up to the horizontal sync pulse after another transducer head is switched off, said plurality of clamp blanking pulses being applied to the reproduce circuit to prevent excursions from the blanking level of the video signal during the existence of the clamp blanking pulses in order to eliminate switching transients.

16. A processing system for an apparatus reproducing a composite video signal with a horizontal sync signal of horizontal sync pulses and with a vertical sync signal during the vertical blanking periods, said processing system comprising: a storage member having a continuous video signal recorded on successive tracks thereon; a rotary member carrying a plurality of transducer heads to consecutively scan the successive tracks on the storage member and reproduce the recorded signal thereon; a reproduce circuit for receiving the reproduced signal from the transducers of the rotary member and forming a desired output therefrom; a reference means for producing a reference signal timed with respect to a horizontal sync pulse during each vertical blanking period; a reproduce switch timer connected to said reference means to produce selectively spaced first occurring and second occurring timing signals during each vertical blanking period; and an electronic switch being connected to the reference means for producing a record switch signal during each vertical blanking period, and said electronic switch being also connected to the reproduce switch timer for alternately connecting and disconnecting the reproduce circuit from the transducer heads, said switch being timed by the first occurring timing signal to electrically connect one transducer head to the reproduce circuit prior to the occurrence of the record switch signal, and said switch being timed by the second occurring timing signal to electrically disconnect another transducer head from the reproduce circuit after the occurrence of the record switch signal, in order to simultaneously connect both of said transducer heads to the reproduce circuit during an overlapping time period beginning prior to and ending after the record switch signal of each vertical blanking period.

17. The processing system as defined in claim 16 which additionally includes: a clamp signal generator connected to the switch timer and to the reproduce circuit to produce a series of clamp blanking pulses during each vertical blanking period, said series of clamp blanking pulses occurring in between all horizontal sync pulses starting from the horizontal sync pulse prior to when a transducer head is switched on up to the horizontal sync pulse after another transducer head is switched off, in order to maintain the blanking level of the video signal in said reproduce circuit during the existence of the clamp blanking pulses.

18. The processing system as defined in claim 16 which additionally includes: a clamp signal generator connected to the switch timer and to the reproduce circuit to produce a plurality of clamp blanking pulses timed by the said first occurring and said second occurring timing signals of the reproduce switch timer and timed by the horizontal sync signal of the video signal to occur in between all horizontal sync pulses starting from the horizontal sync pulse prior to when a transducer head is switched on up to the horizontal sync pulse after another transducer head is switched off, said plurality of clamp blanking pulses being applied to the reproduce circuit to prevent excursions from the blanking level of the video signal during the existence of the clamp blanking pulses in order to eliminate switching transients.

References Cited

UNITED STATES PATENTS

| | | | |
|---|---|---|---|
| 3,084,214 | 4/1963 | Jauernik | 178—6.6 |
| 3,290,438 | 12/1966 | Okamura | 178—6.6 |
| 3,308,232 | 3/1967 | Numakura | 178—6.6 |

ROBERT L. GRIFFIN, *Primary Examiner.*

HOWARD W. BRITTON, *Assistant Examiner.*